(No Model.) 2 Sheets—Sheet 1.
C. A. SMYTH.
SECONDARY BATTERY.
No. 507,463. Patented Oct. 24, 1893.
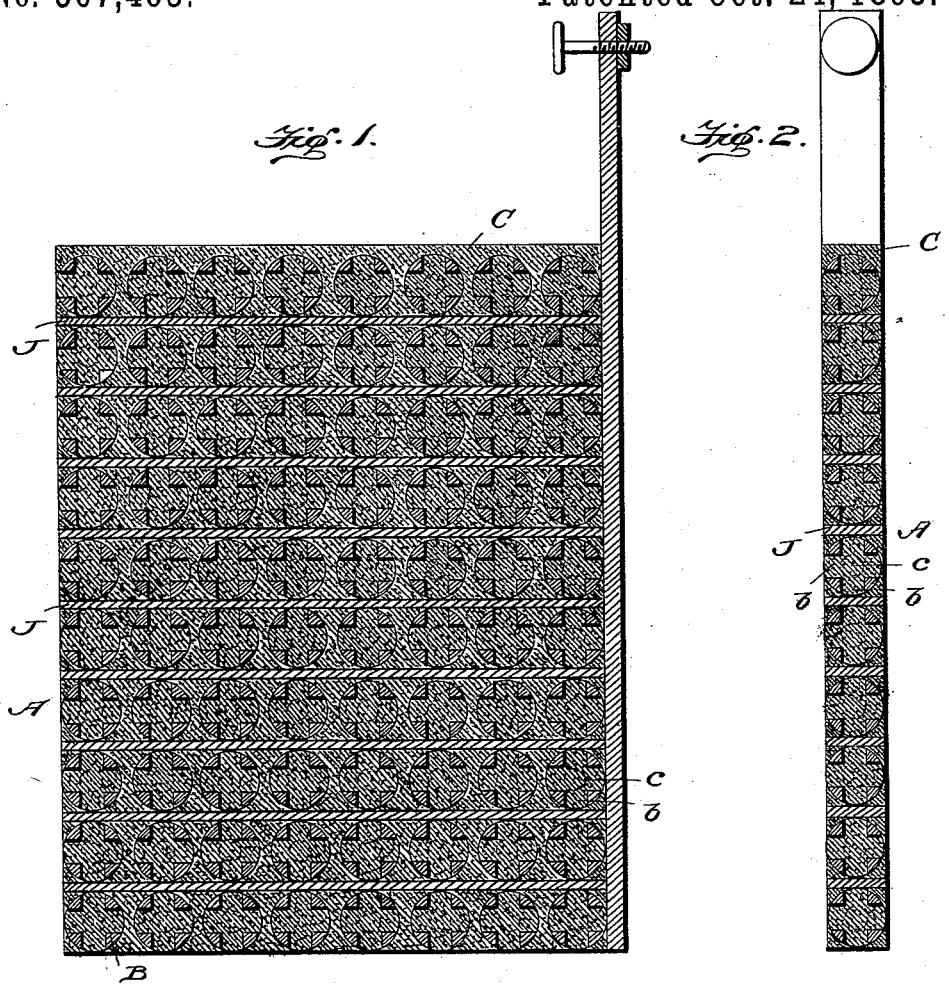
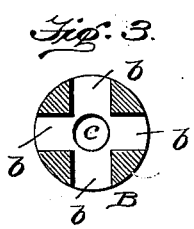
Witnesses:
Wm. C. Dashiell
H. T. Bernhard
C. A. Smyth
Inventor
By Edson Bros.
Att'ys.

(No Model.) 2 Sheets—Sheet 2.
C. A. SMYTH.
SECONDARY BATTERY.
No. 507,463. Patented Oct. 24, 1893.
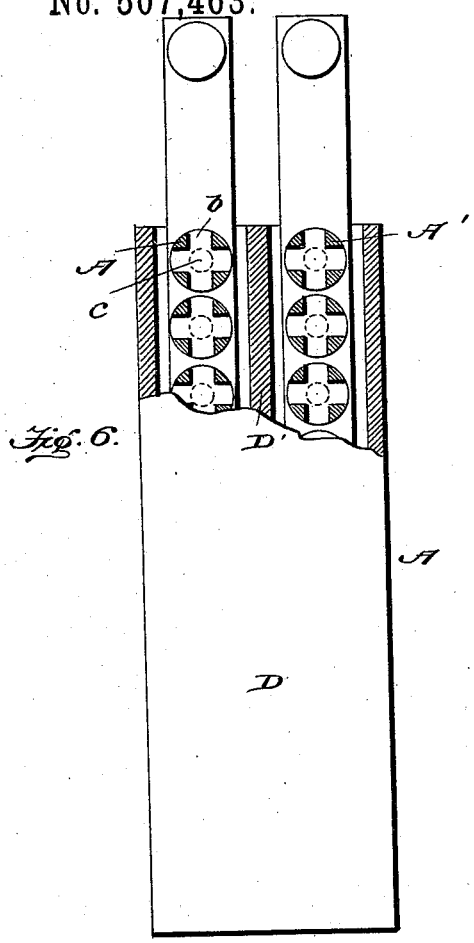
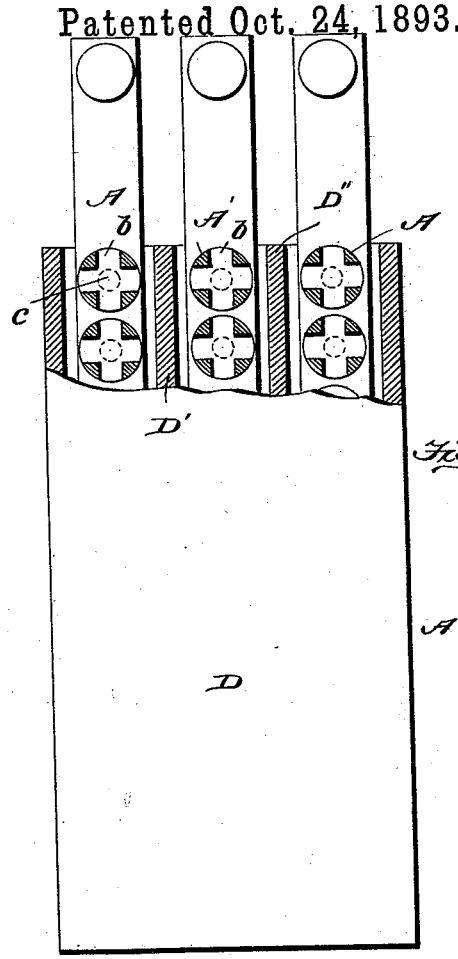
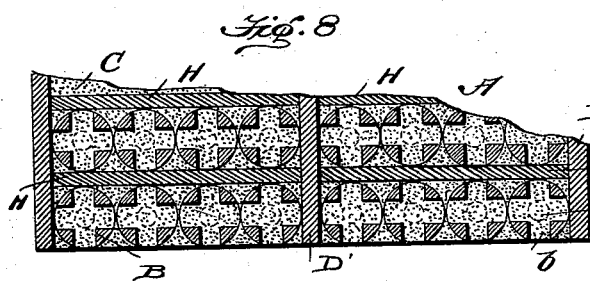
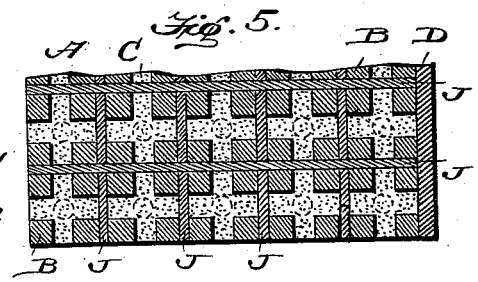
Witnesses:
C. A. Smyth,
Inventor
By Edson Bro's.
Att'ys

UNITED STATES PATENT OFFICE.

CHARLES A. SMYTH, OF MOMENCE, ILLINOIS.

SECONDARY BATTERY.

SPECIFICATION forming part of Letters Patent No. 507,463, dated October 24, 1893.

Application filed March 3, 1893. Serial No. 464,525. (No model.)

*To all whom it may concern:*

Be it known that I, CHARLES A. SMYTH, a citizen of the United States, residing at Momence, in the county of Kankakee and State of Illinois, have invented certain new and useful Improvements in Secondary Batteries; and I do hereby declare the following to be a full, clear, and exact description of the invention, such as will enable others skilled in the art to which it appertains to make and use the same.

My present invention relates to storage or secondary batteries for accumulating electric energy; and the object I have in view is the production of an improved electrode or cell of large storing capacity which will not become short-circuited in use, broken or damaged by rough handling, or injured by discharging too rapidly.

With this end in view, I employ a cell, either porous or non-porous, having one or more longitudinal porous partitions and two or more electrodes arranged within the cell so that the partitions divide or separate the electrodes, each electrode comprising a number of perforated leaden balls or blocks filled with and united together by active material formed into a compact body. In some instances, I arrange the electrodes vertically within the cell on opposite sides of the porous partition therein, and in other instances I arrange the electrodes horizontally one on top of the other in each chamber of the cell, such horizontally disposed electrodes being separated by intervening porous sheets or layers, as of asbestus, the electrodes and layers in one chamber of the cell forming the positive part of the battery and the layers and elements in the other chamber of the cell forming the negative part of the battery.

The invention further consists in the construction of the elements as will be hereinafter more fully described and defined by the claims.

In the accompanying drawings—Figures 1 and 2 are longitudinal and transverse sectional views, respectively, of the elements embodying my improvements for use in a secondary battery. Fig. 3 is a sectional enlarged view of the perforated leaden ball or block. Figs. 4 and 5 are longitudinal and transverse sections of a modified form of the electrode. Fig. 6 is a sectional view through a cell having one porous partition and two electrodes, one positive and the other negative. Fig. 7 is a similar view with the cell provided with two partitions, and three electrodes, two negative and one positive. Fig. 8 is a sectional view through a cell with the electrodes placed horizontally and separated by intervening porous layers or sheets.

Like letters of reference denote like parts in the several figures of the drawings.

Referring more particularly to Figs. 1, 2 and 3 of the drawings, A designates the improved electrode for use in a secondary battery for the accumulation of electric energy. This electrode is a compact solid body or cake composed of leaden balls or blocks B and the active material C which fills perforations in the balls or blocks and serves to unite them together. The balls or blocks B are made of lead, and provided with a multiplicity of passages or holes $b$, $c$, and these passages are preferably formed by the vertical passage $b$ and the lateral passages $c$ which intersect or communicate with said vertical passage $b$, as shown by Fig. 3. The balls or blocks which form, in conjunction with the active material, the solid electrode, are arranged in horizontal layers placed vertically one above the other, and the vertical openings in these blocks or balls are in line with each other while the horizontal passages open through the sides of the electrode so that the active material, which fills the openings in the blocks or balls and the spaces between them, is exposed to the action of the electrolyte at or on the sides of the electrode, thereby presenting a very large area or surface of good conductivity.

The active material may consist of the usual red oxide of lead and plaster of paris (sulphate of lime) mixed with a solution of water and sulphuric acid to reduce the mass to a plastic condition suitable for molding, with the leaden balls or blocks, into a solid compact body or mass; but if it is desired to produce practically a dry secondary battery I use an active material composed of oxide of zinc, chloride of zinc, chloride of ammonia, sugar, plaster, and sufficient water to make the composition plastic and suitable for molding with the balls or block B into the compact solid body or mass. The method of producing this solid electrode is as follows: The perforated leaden balls or blocks are first oxidized by immersing them in, or subjecting them to the action of, a bath composed of nitric acid and water, after which they are thoroughly washed in water and dried. The active material having been reduced to a plastic state, the leaden balls or blocks and the plastic material are placed in a mold and subjected to pressure so that the active material will be forced into the perforations and formed into a compact solid cake or body, after which the electrode is thoroughly dried.

In Fig. 6 of the drawings, I have shown a cell which consists of the receptacle D and the positive and negative electrodes A, A', each of said electrodes being constructed or produced in the manner hereinbefore described. This receptacle may be made of porous material, or of glass or hard rubber; and if of porous material, the receptacle is placed or inclosed within a jar of glass, rubber or other suitable material. This receptacle or cell is provided with a vertical porous partition D' which is arranged centrally therein and serves to divide the cell into two compartments in which are placed the two elements. This porous partition serves to separate the electrodes from each other and to prevent the battery from being short-circuited or from being broken down by rough usage; and in the cell is placed the usual electrolytic solution in which the electrodes are immersed.

In lieu of using only two electrodes to form the cell I may use two negative electrodes and one positive electrode shown by Fig. 7, in which event the three electrodes are separated from each other by the two intervening partitions D', D'' in the cell and the positive electrode is placed between said partitions and thus between the two negative electrodes.

The electrodes shown by Figs. 6 and 7 of the drawings are placed vertically within the compartments of the cell or receptacle; but in Fig. 8 I have shown another embodiment of my invention in which the solid electrodes are arranged horizontally and separated from each other by intervening layers or sheets of porous material, preferably asbestos. I use a cell or receptacle with the porous partition D' (one or more), and in one of the compartments of the cell I place a horizontal electrode, then on top of the same a layer, H, of porous material, and then successive electrodes and layers until the compartment is filled, the whole forming one part of the battery. The other compartment of the cell is filled with the horizontal electrodes and layers H in like manner, to form the other part, and then the electrolytic solution is placed or poured into the cell. The connections are made by leaden strips, preferably of a width equal to the diameter of the ball or block in the electrodes, which strips extend above the receptacle or cell a sufficient distance to enable the conductors to be attached thereto which lead to adjacent cells to form the battery when more than one cell is used, the coupling of the cells being effected in the usual or any desirable way.

I would have it understood that I do not restrict my invention to any particular shape of the perforated balls or blocks, although I have shown in Figs. 1 and 2 the globular balls, and in Figs. 4 and 5 the cubical blocks, as the preferred embodiments of the invention.

In order to make a practically dry battery, I use the compound of active material composed of oxide of zinc, chloride of zinc, sal ammoniac, sugar, sulphate of lime, and water and arrange the electrodes in layers with intermediate absorbent material as indicated in Fig. 8; but this can be varied by incorporating in the electrodes themselves the layers of porous material J as shown in Figs. 1, 2, 4 and 5. These layers of porous material, J, preferably asbestos, are placed between the series of balls or blocks, which are preferably first filled with the active material, and then the balls or blocks and the layers J are molded with the active material to the desired form.

What I claim as new, and desire to secure by Letters Patent, is—

1. The method of producing an electrode for secondary batteries which consists in oxidizing perforated leaden balls or blocks in a bath of nitric acid and water; producing a plastic active material; and finally molding the active material and perforated blocks or balls and subjecting the same to pressure, to fill the perforations in said balls or blocks and unite the whole into a solid homogeneous body, as set forth.

2. A secondary battery consisting of a receptacle divided into separate compartments by a porous partition, and the electrodes formed of perforated balls or blocks arranged in parallel series and united solidly together by active material which fills the spaces in and between said balls or blocks, the respective compartments of said receptacle containing a series of horizontal layers which are separated from each other by porous layers between adjacent layers, substantially as and for the purposes described.

3. A rigid electrode for a secondary battery consisting of closely adjacent balls or blocks arranged in horizontal layers one above the other and provided with vertically aligned openings and the horizontal passages that open through the sides of said electrode, and the active material which unites the said balls or blocks into a compact solid mass, fills the openings or passages therein and the spaces between the same, and is exposed on the sides and ends of the electrode through the horizontal and vertical openings in said balls or blocks, substantially as described.

4. A rigid electrode for secondary batteries consisting of closely adjacent perforated balls or blocks arranged in layers one above the other, the active material which fills said balls or blocks and unites them solidly together in a compact form, and the porous layers incorporated between said series of balls or blocks and with the active material, substantially as described.

In testimony whereof I affix my signature in presence of witnesses.

CHARLES A. SMYTH.

Witnesses:
FRANK E. LANE,
CHAS. MILLER,
WALTER A. BROWN.